United States Patent [19]
Gray, Jr. et al.

[11] Patent Number: 5,934,334
[45] Date of Patent: Aug. 10, 1999

[54] CASING SPACERS

[75] Inventors: Patrick H. Gray, Jr., Wabash, Ind.; Stephen R. McDonald, Jacksonville, Fla.

[73] Assignee: Ford Meter Box Company, Inc., Wabash, Ind.

[21] Appl. No.: 08/588,518

[22] Filed: Jan. 18, 1996

[51] Int. Cl.[6] ..................................................... F16L 9/18
[52] U.S. Cl. .......................... 138/112; 138/113; 138/114; 138/108; 138/148; 285/123.1
[58] Field of Search ............................ 138/112–114, 111, 138/108, 110, 155, 148, 103; 285/114, 368, 374, 400, 404, 123.1, 123.15; 248/68.1

[56] References Cited

U.S. PATENT DOCUMENTS

| | | |
|---|---|---|
| 1,122,130 | 12/1914 | Lamson . |
| 2,668,066 | 2/1954 | Stadelhofer ...................... 285/123.1 X |
| 2,706,495 | 4/1955 | Risley .............................. 285/123.1 X |
| 2,816,575 | 12/1957 | Stokes . |
| 3,168,114 | 2/1965 | Martin . |
| 3,964,754 | 6/1976 | Murai et al. ......................... 138/114 X |
| 4,124,040 | 11/1978 | Miller ...................................... 138/148 |
| 4,354,657 | 10/1982 | Karlberg . |
| 4,492,391 | 1/1985 | Haines . |
| 4,573,527 | 3/1986 | McDonough .................. 285/123.15 X |
| 4,635,970 | 1/1987 | Haines . |
| 5,441,082 | 8/1995 | Eskew et al. ........................... 138/112 |

OTHER PUBLICATIONS

"Get Into Position Quickly and Easily with Casing Spacers From Advance & Systems" advertisement by Advance Products & Systems, Inc., Lafayette, Louisiana.

"The Model M Series" Form 687 brochure by CALPICO Inc., Corrosion Control and Piping Hardware, San Francisco, California.

"Pipeline Insulators and Casing Seals" brochure, p. 10, handwritten Apr., 1991.

"All Stainless Steel Casing Spacers, Position Pipe Within Casing Under Roadways, Railroads, Bridges, and Canals. Ideal For Sliplining." brochure by Cascade Waterworks Mfg. Co., Yorkville, Illinois, handwritten Apr. 25, 1991.

"Assembly Instructions Series 1300 (14"–36" sizes)" and "Assembly Instructions Series 1390 (14"–36" sizes)" by Uni–Flange Corporation, Jacksonville, Florida.

(List continued on next page.)

*Primary Examiner*—Patrick F. Brinson
*Attorney, Agent, or Firm*—James L. Ewing, IV; Kilpatrick Stockton LLP

[57] ABSTRACT

Casing spacers for isolating carrier pipe mechanically, galvanically, and chemically from pipe casings. The spacers may be attached using fasteners to pipe joint restrainers or other ring structures which encircle carrier pipe. The spacers are more efficient to install in the field, provide robust mechanical structure and physical stability which does not degrade over time, provide additional protection to the pipe joints, and, because they may be attached to conventional structures instead of requiring an integral ring structure for encircling a pipe, alleviate the distribution and inventory problems encountered by conventional systems in which the casing spacer runners are attached to an integral ring structure which must conform to the carrier pipe size and the casing inner diameter.

22 Claims, 7 Drawing Sheets

OTHER PUBLICATIONS

"PSI Stainless Steel Casing Spacer, A Tough, Heavy Duty Stainless Steel Casing Spacer Manufactured by PSI, The Leader In Casing Spacer Products For Over 30 Years.", PSI–120/RFV 3–92 brochure by Pipeline Seal and Insulator, Inc., Houston, Texas.

"Uni–Flange Series 1300/1390 Joint Restraint System for Ductile Iron Pipe and Fittings" brochure by Uni–Flange Corporation, Jacksonville, Florida.

"CASCADE All Stainless Steel Casing Spacers; A System to Position Water and Sewer Pipe in Casings Used for Road Crossings" brochure by Cascade Waterworks Mfg. Co., Yorkville, Illinois, Sep., 1987.

"Corrosion Control For Cased Pipelines" *Pipeline & Gas Journal,* advertisement by ITN Corporation, Houston, Texas, Mar. 1991, p. 25.

"Fleet–Line Welding Fittings" *Pipeline & Gas Journal,* advertisement by Steel Forgings, Inc., Shreveport, Louisiana, Mar. 1991, p. 26.

"All Stainless Steel Casing Spacers; Position Pipe Within Casing Under Roadways, Railroads, Bridges and Canals. Ideal for Sliplining." brochure by Cascade Waterworks Mfg. Co., Yorkville, Illinois, pp. 1–8.

"Casing Spacers For Positioning Water & Sewer Pipelines Within Casing" brochure by Advance Products & Systems, Inc., Lafayette, Louisiana.

"PSI Casing Spacers Designed Especially For Water and Sewer Cased Pipelines" brochure by Pipeline Seal and Insulator, Inc., Houston, Texas.

"RacaiInsulators." advertisement by RECON Pipe Corporation. (USA), British Columbia, handwritten AWWA, May 1992, p. 127.

"Casing Insulators and End Seals" brochure by Advance Products & Systems, Inc., Lafayette, Louisianna.

"Get Into Position Quickly and Easily With Casing Spacers From Advance Products & Systems" advertisement by Advance Products & Systems, Lafayette, Louisiana.

"Spider Supports and Spacers, A Device For Supporting Underground Pipes, Conduits and Cables Within the Steel Casing Of A Horizontal Bore Beneath A Roadbed, Runway, and Railroad Crossing or the Like." brochure by WaterPro Supplies Corporation, Raleigh, North Carolina.

"Adjusta–Spacers, A Field Adjustable Casing Spacer For Cased Crossings of Gravity Sewer PVC Lines." brochure by Pipeline Seal and Insulator, Inc., Houston Texas.

"Casing Seals and Insulators" 1988 PI–SIC–990 brochure by Pipeline Seal & Insulator, Inc., Houston, Texas.

"Uni–Flange Joint Restraint System for PVC Pipe, Series 900, Series 1300, Series 1350, Series 1360, Series 1390" brochure by Uni–Flange, Jacksonville, Florida.

CASING SPACERS

The present invention relates generally to spacers which may be disposed between carrier pipes and corresponding casings in order to isolate the carrier pipes physically, chemically and galvanically, as desired.

BACKGROUND OF THE INVENTION

Carrier pipes such as those used in municipal water systems often encounter significant dynamic and static loads, corrosive elements, vibrations, and other destructive factors associated with aggressive environments such as under roads, railway rights-of-way, and other underground locations. Carrier pipe which is not surrounded by a protective, larger diameter casing is therefore generally more prone to failure, leakage-producing deformation and degradation over time than protected carrier pipe. However, carrier pipe simply placed in a casing without proper spacing from the casing suffers galvanic and chemical reactions and exposure to the carrier pipe underside due to contact between the carrier pipe and the spacing.

Conventional casing spacers include the "band and boards" systems in which suitably sized lumber may be banded about desired portions of the carrier pipe before it is placed in the casing. The lumber tends to degrade over time, however, and may be destroyed or inadvertently displaced during installation. Such wooden spacers also typically result in high labor costs, because they require generally three to six workers and considerable coordination and planning to install. Physically, they are easily dislodged and place an uneven load on the pipe unless the boards are spaced symmetrically. They may rot and allow settlement, or they can, on the other hand, swell and subject carrier pipe joints to breakage. They do not provide complete assurance of electrical insulation, and chemically, they allow bacteria and differential oxygen concentration corrosion.

A more recent approach in view of these problems has been the use of specially designed casing spacers which feature a preformed steel or plastic band for encircling the carrier pipe, on which glass reinforced plastic runners are formed, generally in a "star" configuration when viewed in cross section. Installation instructions for such spacers address a problem often faced also with band and boards approaches: the spacers do not sufficiently protect the joints. Instead, they are disposed between non-joint portions of the carrier pipe and the casing spacer so that the joint portions are cantilevered from the points supported by the casing spacers. This more recent approach therefore does not allow the pipe joint itself to be positioned with respect to the casing so that the joint may flex without being subjected to undue forces. The inventor has additionally found that such spacers are subject to inadvertent destruction and deformation as the carrier pipe is placed in the casing, because of the relatively lightweight construction when compared with the heavier carrier pipe. Furthermore, such spacers present significant distribution and inventory problems for suppliers and distributors since multiple sizes and configurations must be carried to accommodate different sizes and types of carrier pipe and casings.

SUMMARY OF THE INVENTION

The present invention provides casing spacers which are heavy duty (formed of ductile iron if desired) and which may, conveniently, be attached directly to the carrier pipe using carrier pipe components that already exist. Such components include the restrainer rods and clamping screws conventionally already required to assemble the restrainers that restrain the joints between successive lengths of carrier pipe. The spacers feature a bracket whose structure places a runner generally longitudinally to the carrier pipe, at a predetermined distance from the carrier pipe, in order to be disposed between the carrier pipe and the casing spacer. A heavy duty bracket undergirds the runner and connects to the carrier pipe via a conventional restrainer rod. Such rods are conventionally employed to bias two restrainers (and thus pipe sections) together. Alternatively, the casing spacers may be attached to the carrier pipe via conventional clamping bolts, which conventionally bias portions of a restrainer (or other) ring together. The (preferably ductile iron) heavyweight construction of the spacers ensures that they (lo not deform or destruct during installation of the carrier pipe in the casing. The (preferably high density polyethylene) runners provide desired chemical and galvanic isolation, while being sufficiently supported by the heavy duty spacing bracket to ensure that sufficient mechanical strength is provided. The runners also, because of their relatively low coefficient of friction, allow easier installation of the carrier pipe by allowing it to slide relative to the casing when being installed. A single size of bracket may accordingly be employed to accommodate various diameters of carrier pipes and casings, and the brackets may contain openings formed as desired to allow flexibility in positioning the spacers with respect to the carrier pipe and the casing so that additional accommodations may be made as to size.

It is accordingly an object of the present invention to provide casing spacers which feature increased mechanical strength and galvanic and chemical isolation properties.

It is an additional object of the present invention to provide casing spacers which require only relatively low labor costs for installation, are easy to install in the field, are not subject to rot, do not allow settlement, do not swell or break pipe joints, and are not subject to inadvertent deformation during installation.

It is an additional object of the present invention to provide casing spacers which simplify inventory and distribution requirements by allowing one or only a few sizes of spacer to accommodate various diameters of pipes and casings.

Other objects, features and advantages of the present invention will become apparent with respect to the remainder of this document.

DETAILED DESCRIPTION OF THE DRAWINGS

Figure 1:
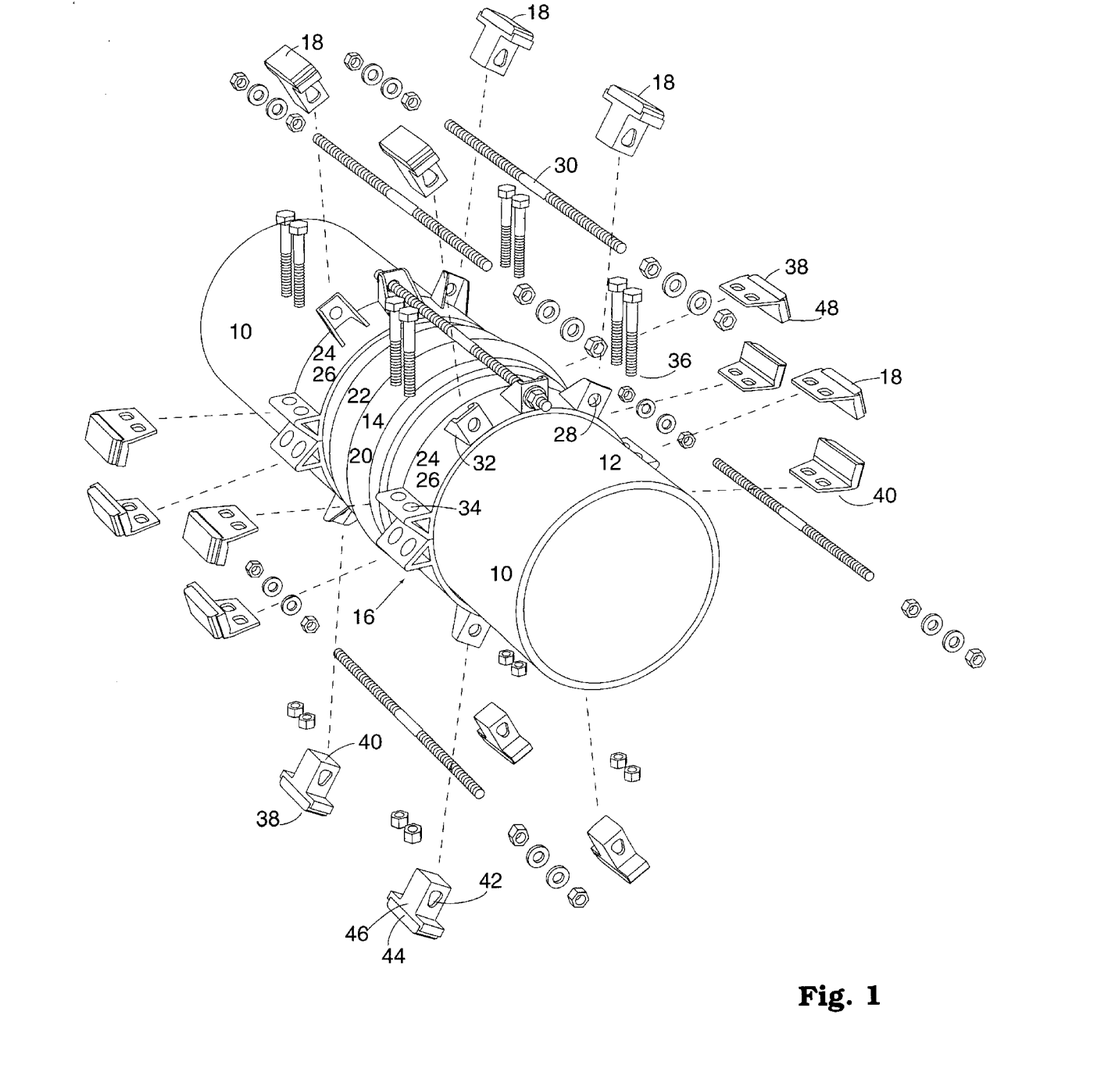
FIG. 1 is an exploded perspective view of a carrier pipe and spacers, according to the present invention.

FIG. 1 shows portions of successive sections 10 of carrier pipe 12 forming a joint 14 as restrained by a restrainer 16 which accommodates spacers 18 according to the present invention. Carrier pipe 12 may be of any desired length, diameter, material and ultimate purpose. Typically, as shown in FIG. 1, one section 10 may form a bell end 20 which receives a spigot end 22 of the adjacent section. The bell end 20 and the spigot end 22 mate to form a fluid-tight joint, with appropriate material interposed to form a sealant or gland as desired, in conventional fashion. There are obviously many other types of pipe joints, all of which fall within the ambit of this invention; the carrier pipe 12 structure shown in the figures is therefore nonlimiting.

The bell end 20 and the spigot end 22 are conventionally secured in place, as against tensile loads, for instance, by a restrainer 16. The restrainer 16 shown in FIG. 1 is only one restrainer structure, which has been selected for purposes of illustration and explanation, of a plethora of conventional (and unconventional) restrainer structures. The restrainer 16 structure shown in the figures should not be construed or understood as limiting the present invention, which provides spacers 18 that may be connected as desired to any existing restrainer or other conventional structure which encircles carrier pipe and provides surfaces or openings which accommodate bolts, rods or other fasteners.

Subject to the foregoing, the restrainer shown in FIG. 1 is formed of a pair of restrainer rings 24. Each ring may, but need not be, be formed of a pair of ring halves, 26 or other proportional sections 26. In FIG. 1, restrainer rings 24 are each formed of a pair of restrainer ring halves 26.

Each restrainer ring 24 may include a plurality of restrainer rod openings 28 which receive and accommodate restrainer rods 30 which connect rings 24 and thus absorb the tension imposed on joint 14. The rings 24 as shown in FIG. 1 feature a plurality of ears 32 which may simply be any desired physical structure to support the openings and absorb the loads placed on restrainers 16 by rods 30. Rods 30 may be connected to restrainer rings 24 in conventional fashion using nuts tensioned as desired or other fasteners. The ears or other structure supporting the openings 28 may be cast, welded, or formed on or attached as otherwise desired to restrainer rings 24.

The restrainer rings 24 shown in FIG. 1 are each formed of two halves 26 which are in turn held together using clamping pads 34 which accommodate clamping bolts 36 in conventional fashion. Clamping bolts 36 may be tensioned as desired using nuts or other fasteners to secure rings 24 to the carrier pipe 12 as desired. Pads 34 may be cast, stamped and bent, or formed as otherwise desired on ring halves 26. As mentioned above, the restrainer rings 24 need not be formed of halves, in which case no clamping pads are required. Hinges (not shown) or other fasteners may supplant one pair of clamping pads 34 for easier installation, if desired. As stated above, the specific structure of the particular ring encircling the carrier pipe 12 is relatively immaterial to the present invention. What is material is that spacers 18 are provided which may attach to any fastener that is or may be used with components that encircle pipe, such as restrainer rings 24.

Figure 2:
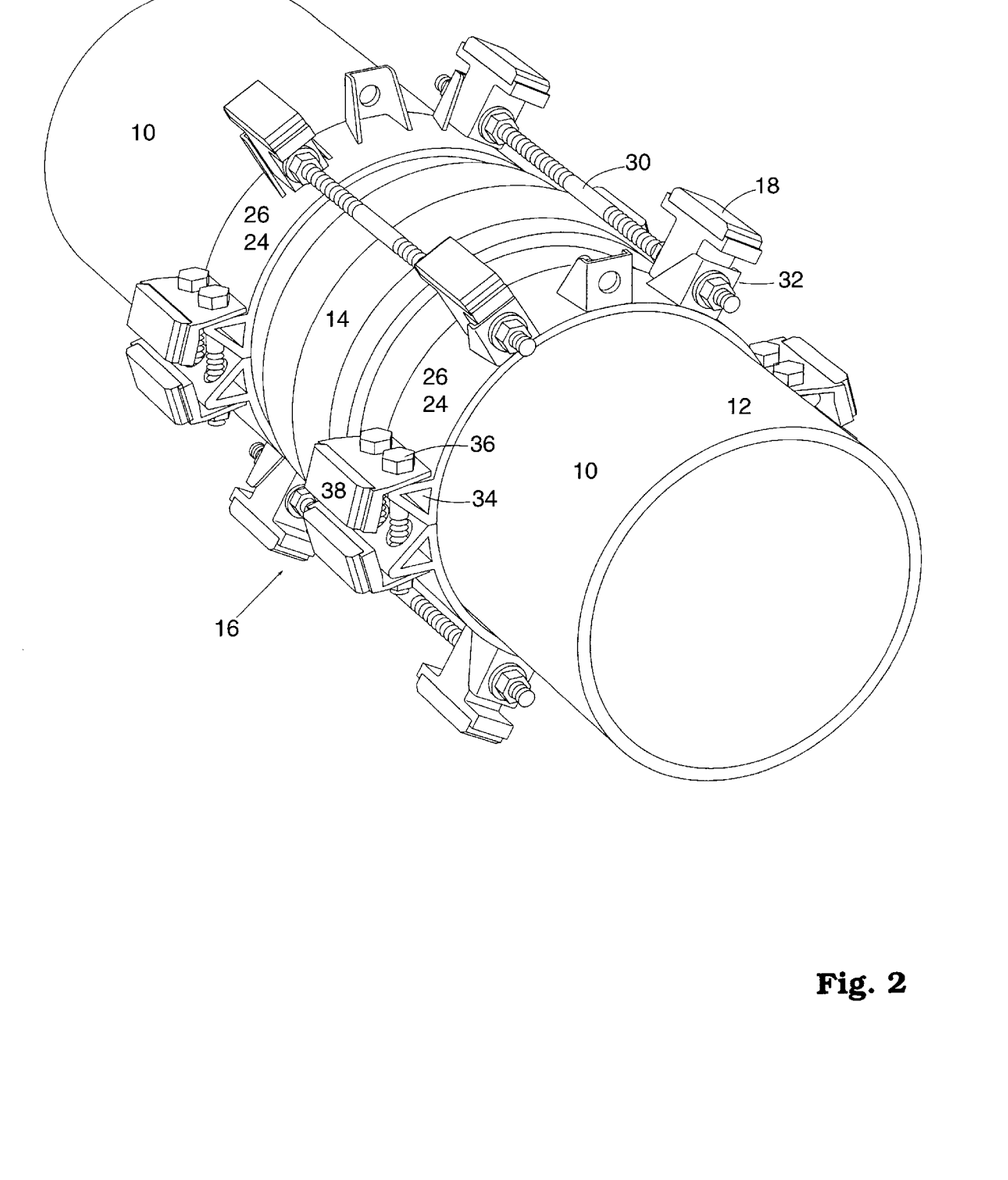
FIG. 2 is a perspective view of the pipe and spacers of FIG. 1.
Figure 3:
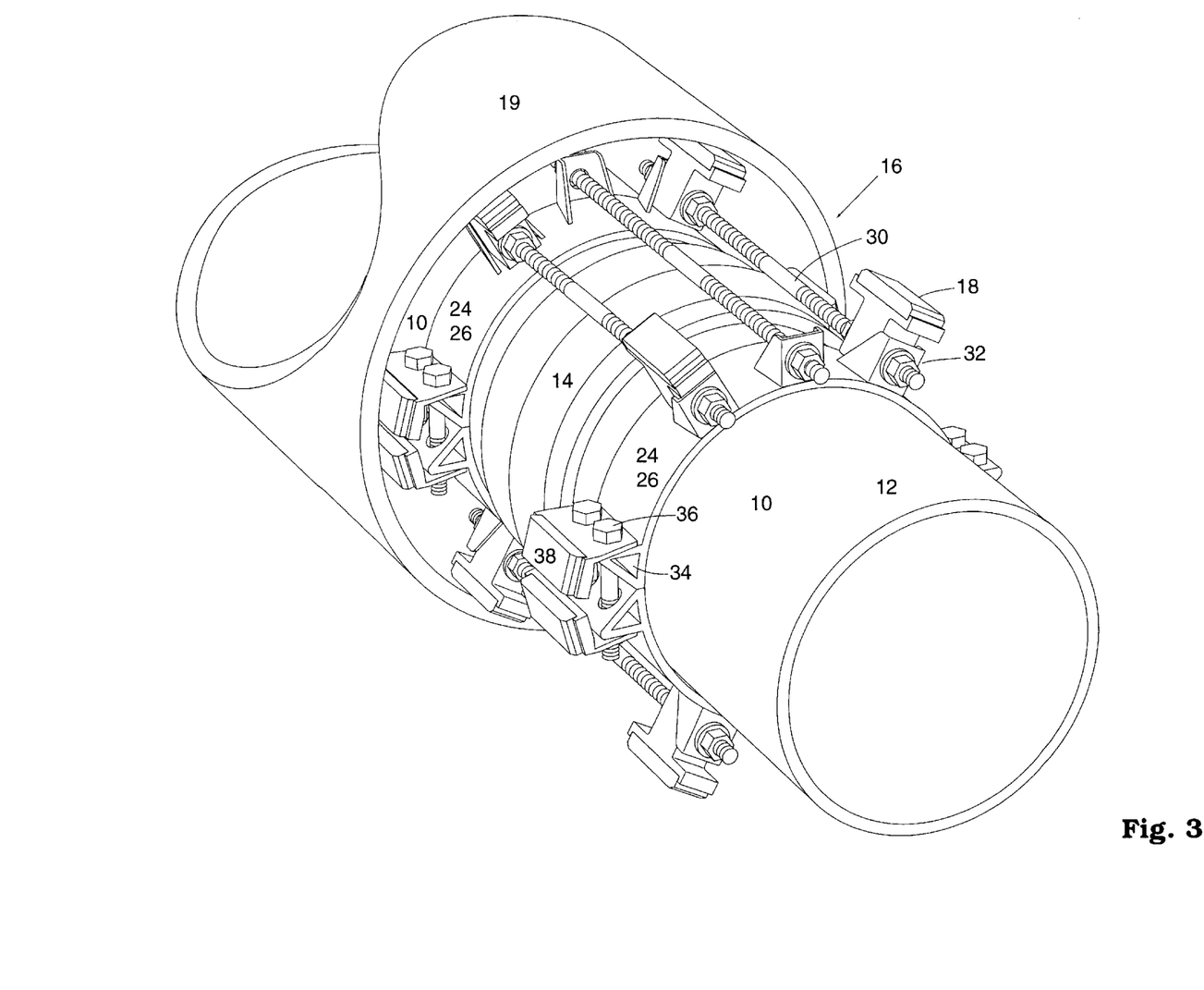
FIG. 3 is a view of the pipe and spacers of FIG. 1, together with casing.

Spacers 18 as shown in FIGS. 1–3 each comprise generally a runner 38 and a bracket 40. Runner 38 may be formed of any desired material which provides appropriate friction strength, electrical insulation, and chemical insulation properties. In a preferred embodiment, the runners 38 are formed of ultrahigh molecular weight (high density) polyethylene for appropriate performance according to these properties. Each bracket 40 comprises a portion which supports an attachment opening or openings 42 which are employed to connect the spacers 18 to the rings 24 via bolts 36, rods 30 or other desired or appropriate fasteners. The brackets include a second, foot portion 44 which undergirds the runner 38. In the preferred embodiment, foot portion 44 is placed at a predetermined angle, as desired, with respect to the portion that supports the attachment openings 42. The bracket may be formed of any desired material, but preferably of cast ductile iron for desirable strength and cost performance.

Figure 4:
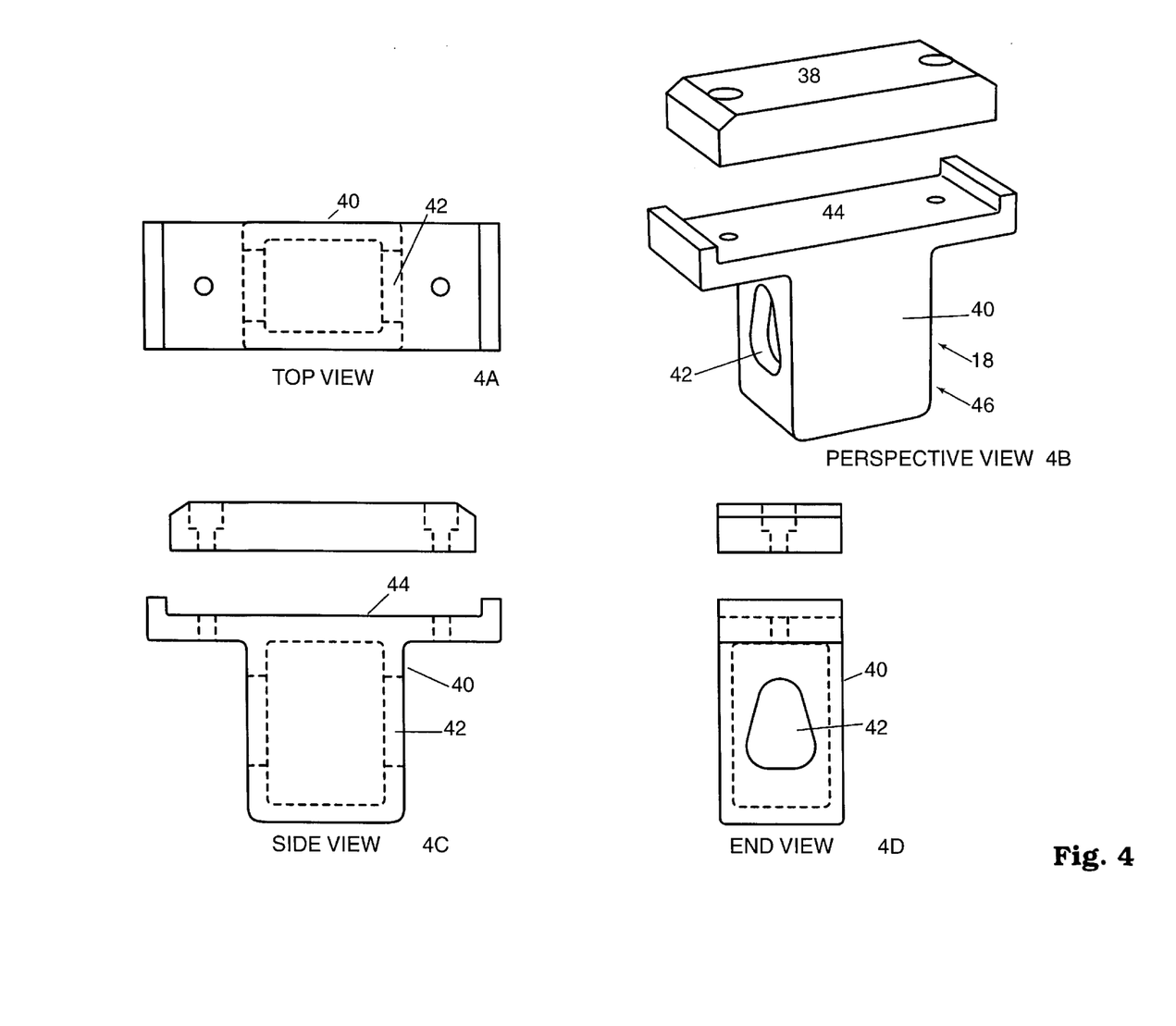
FIGS. 4A–4D show various aspects of a first embodiment of spacers according to the present invention.
Figure 5:
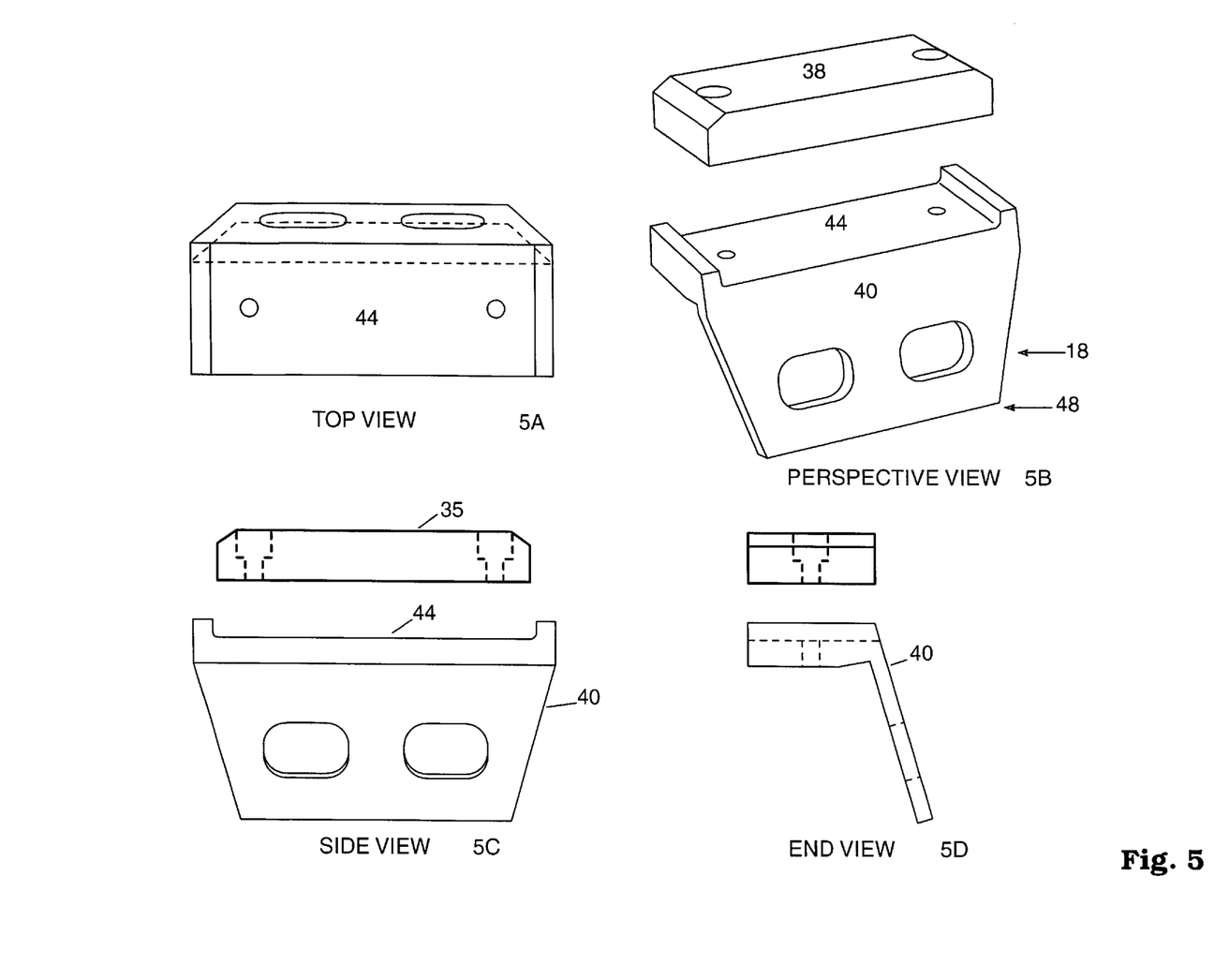
FIGS. 5A–5D show various aspects of a second embodiment of spacers according to the present invention.

Exemplary (but not exclusive) among the various configurations of spacers 18 which may be provided according to the present invention are restrainer rod mounted spacers 46 (FIG. 4) and clamping bolt mounted spacers 48 (FIG. 5). In the first variety, the attachment opening 42 is disposed, via appropriate structure, so that the restrainer rod 30 extends substantially parallel to the runner 38 when the spacer 46 is installed. By contrast, in the clamping bolt mounted spacer 48, the clamping bolt or bolts 36 run substantially perpendicular to the direction in which the runner 38 extends (because the bolts 36 are perpendicular to the longitudinal direction of the carrier pipe 12).

Figure 6:
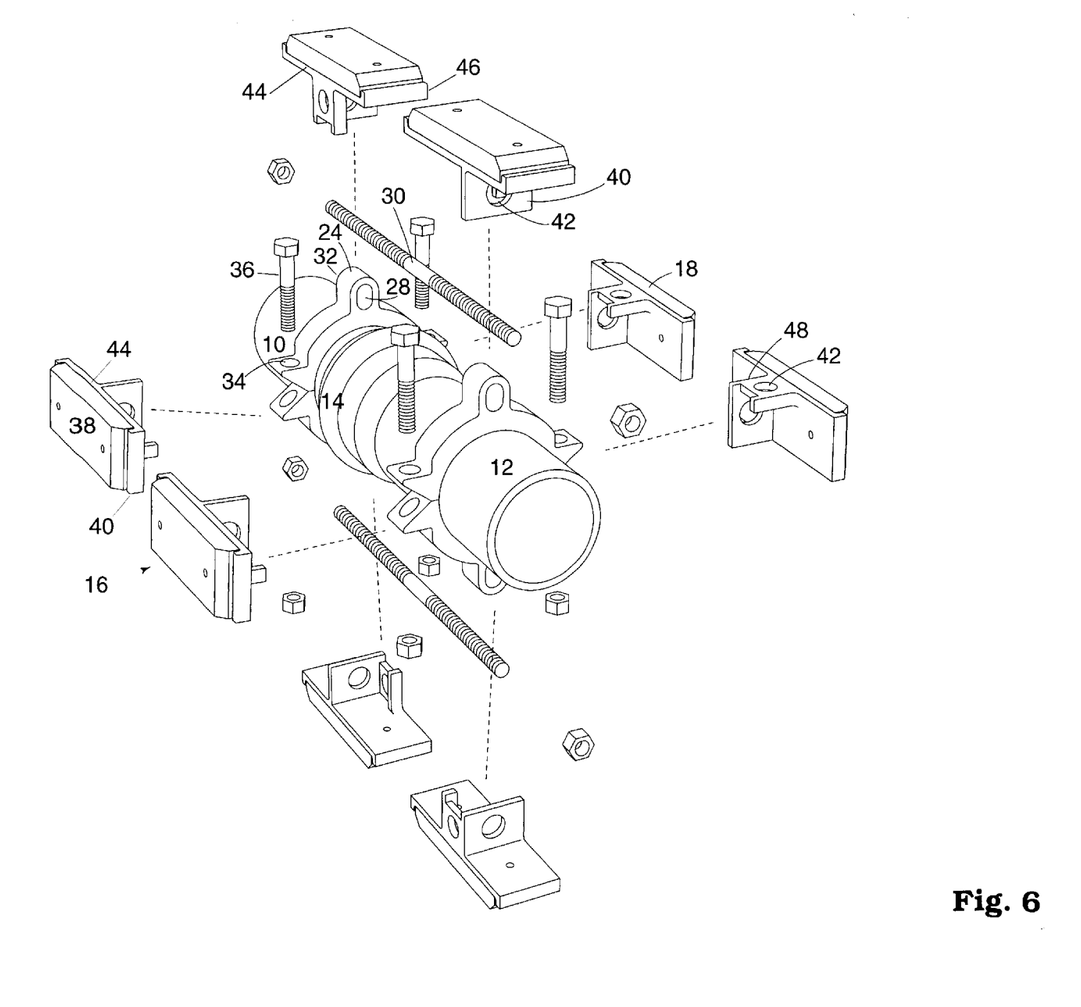
FIG. 6 is an exploded perspective view of a carrier pipe and a second embodiment of the present invention.
Figure 7:
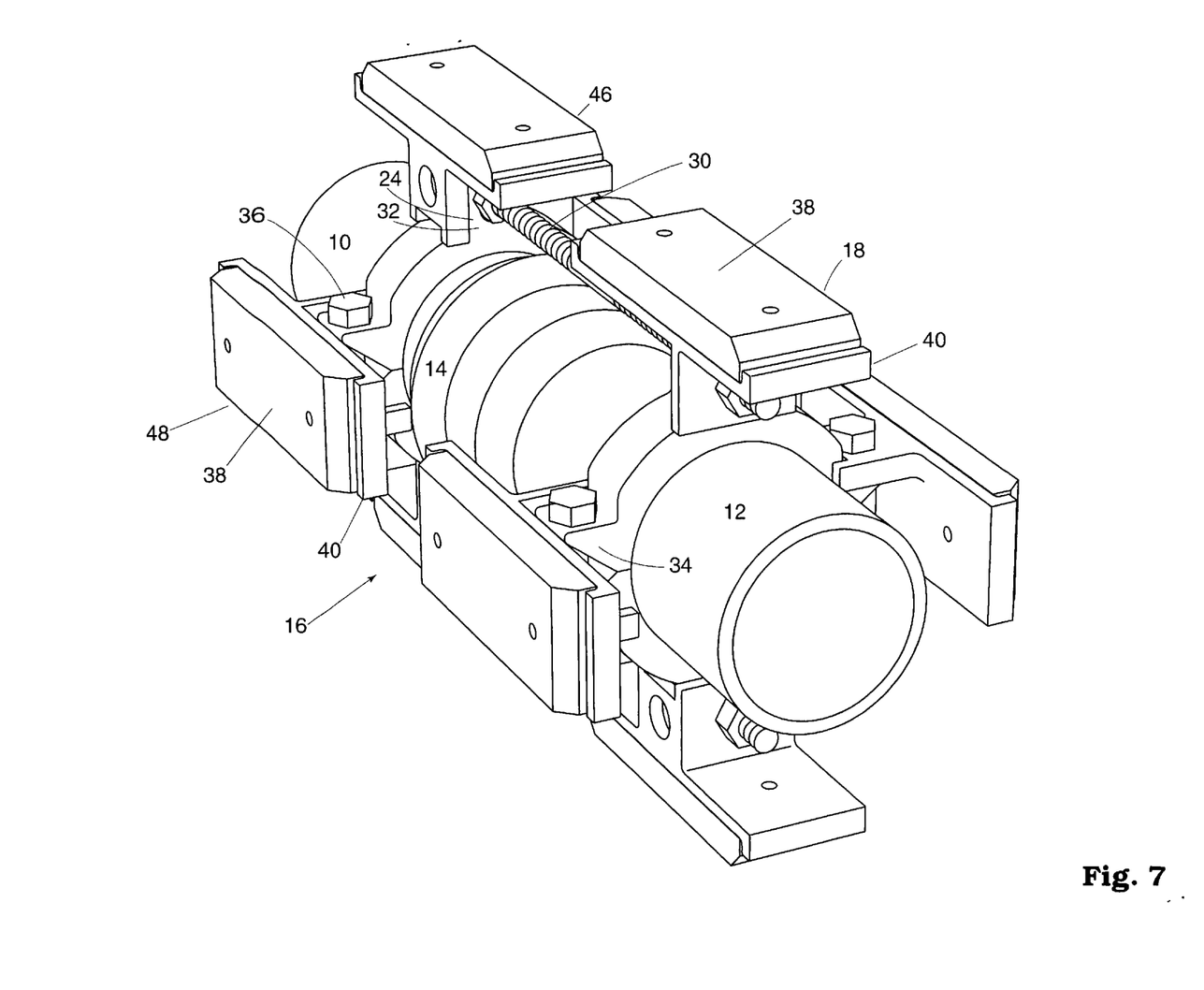
FIG. 7 is a perspective view of the pipe and spacers of FIG. 6.

An alternative embodiment of the present invention is shown in FIGS. 6 and 7, in which is shown a cast restrainer 16 for smaller diameter pipe. There, the structure of spacers 18 is somewhat different, to accommodate the different size and configuration of the ears 32 and restraining rods 30, and clamping pads 34 and clamping bolts 36 of the restrainer 16, respectively. For the restraining rod 30 mounted spacer 18, the foot portion 44 of the bracket 18 is cantilevered off of the structure that forms the attachment opening 42, in a direction longitudinal to the restraining rod 30 when the spacer 18 is mounted. The clamping bolt 36 mounted spacer 18 also contains a bracket 40 with a foot portion 44 and an attachment opening 42 portion, but again the attachment opening is formed toward an end of the bracket 40 in order to accommodate the smaller dimensions of the cast restrainer 16 for the smaller diameter pipe. Note also that the attachment opening 42 of this clamping bolt mounted spacer 48 is open, rather than forming a closed hole in the bracket 40.

During use, the spacers 18 may be installed as the restrainer rings 24 are installed, to form a structure as shown in FIG. 2. The restrainer 16—with—spacers 18 may then be inserted into the casing 19, as carrier pipe 12 is inserted in conventional fashion. The spacers 18 require substantially no additional effort for installation beyond the assembly of the conventional restrainer 16, yet provide all of the desirable properties mentioned in the "Summary of the Invention" section above.

The foregoing has been provided for purposes of explanation and illustration of a preferred embodiment of the present invention. Other structures, changes, adaptations and modifications may be provided without departing from the scope or spirit of the present invention.

What is claimed is:

1. A casing spacer assembly, comprising:
   a. a carrier pipe;
   b. a casing which is adapted to contain at least a portion of the carrier pipe;
   c. at least one component adapted to encircle a portion of the carrier pipe, which component contains a plurality of connection openings, each adapted to receive a fastener;
   d. a plurality of spacers, each adapted to be connected to the component by at least one of the fasteners, and each comprising:
      (1) a bracket adapted to be connected to the component by at least one of the fasteners; and (2) a runner connected to the bracket, which runner is formed of plastics material, which runner is adapted to be interposed between the carrier pipe and the casing.

2. A casing spacer assembly according to claim 1 in which the carrier pipe contains at least one joint restrained by two restrainer rings forming at least two components, and the spacers are connected to at least one of the restrainer rings.

3. A casing spacer assembly according to claim 2 in which at least one of the restrainer rings is formed of two halves, each adapted to span substantially half of the circumference of the carrier pipe, each half containing at least one clamping pad which in turn contains an opening for receiving a clamping bolt, and in which the spacers are connected to the restrainer ring halves by the clamping bolts.

4. A casing spacer assembly according to claim 3 in which at least one of the restrainer rings comprises a plurality of ears, each featuring an opening for receiving a restrainer rod that spans the two restrainer rings in a direction substantially parallel to the axis of the carrier pipe, and in which each spacer is connected to the restrainer ring by a restrainer rod.

5. A casing spacer assembly according to claim 1 in which the component is formed of cast ductile iron.

6. A casing spacer assembly according to claim 1 in which the component is formed of structural steel.

7. A casing spacer assembly according to claim 4 in which each clamping pad and each ear is cast as part of the restrainer.

8. A casing spacer assembly according to claim 4 in which each ear is welded to the restrainer ring.

9. A casing spacer assembly, comprising:
   a. a restrainer ring which is adapted to encircle a portion of a carrier pipe, which ring contains at least one restraining opening for receiving a restrainer rod;
   b. a plurality of restrainer rods; and
   c. a plurality of spacers, each comprising a bracket which in turn contains at least one opening to receive one of the restrainer rods for connection to the restrainer ring, and a runner connected to the bracket so as to be interposed between the bracket and a casing in which the carrier pipe is adapted to be contained.

10. A casing spacer assembly according to claim 9 in which the restrainer ring further comprises a pair of ring halves, each of which contains at least one clamping pad that contains an opening for receiving a clamping bolt which, when tightened, clamps the two halves together, and a plurality of spacers, each comprising a bracket which in turn contains at least one opening to receive one of the clamping bolts for connection to the restrainer ring half, and a runner connected to the bracket so as to be interposed between the bracket and the casing.

11. A casing spacer assembly according to claim 9 in which each bracket comprises:
   a. a radial web which contains at least one opening for receiving the restrainer rod and which, when connected to the restrainer, extends in a direction substantially radially to the carrier pipe;
   b. a footplate connected to the web, which footplate extends in a direction substantially parallel to the direction in which the restrainer rod penetrates the opening; and
   c. a runner connected to the footplate, which runner extends in a direction substantially parallel to the direction in which the restrainer rod penetrates the opening.

12. A casing spacer assembly according to claim 10 in which each bracket that is adapted to be connected to a restrainer ring half comprises:
   a. a radial web which contains at least one opening for receiving a clamping bolt and which, when connected to the restrainer ring half, extends in a direction substantially radially to the carrier pipe;
   b. a footplate connected to the web, which footplate extends in a direction substantially perpendicular to the direction in which the clamping bolts penetrate the openings; and
   c. a runner connected to the footplate, which runner extends in a direction substantially perpendicular to the direction in which the clamping bolts penetrate the openings.

13. A casing spacer assembly, comprising:
   a. a restrainer ring, comprising two restrainer ring halves, each of which is adapted to encircle a portion of a carrier pipe and each of which contains:
      (1) a plurality of ears, each of which contains at least one restraining opening for receiving a restrainer rod; and
      (2) at least one clamping pad, each of which contains at least one opening for receiving a clamping bolt adapted to fasten the two halves together;
   b. a plurality of restrainer rod spacers, each comprising a bracket which in turn contains at least one opening adapted to receive one of the restrainer rods for connection to the restrainer ring half, and a runner connected to the bracket so as to be interposed between the bracket and a casing in which the carrier pipe is adapted to be contained; and
   c. a plurality of clamping pad spacers, each comprising a bracket which in turn contains at least one opening adapted to receive a clamping bolt for connection to the restrainer ring half, and a runner connected to the bracket so as to be interposed between the bracket and the casing.

14. A casing spacer assembly according to claim 13 in which the restrainer ring halves are formed of cast ductile iron.

15. A casing spacer assembly according to claim 13 in which the restrainer ring halves areas formed of structural steel.

16. A casing spacer assembly according to claim 13 in which each clamping pad and each ear is cast as part of the restrainer.

17. A casing spacer assembly according to claim 13 in which each ear is welded to the restrainer ring.

18. A casing spacer assembly according to claim 13 in which each bracket adapted to be connected to an ear of a clamping ring half comprises:
   a. a radial web which contains at least one opening for receiving the restrainer rod and which, when connected to the restrainer, extends in a direction substantially radially to the carrier pipe;
   b. a footplate connected to the web, which footplate extends in a direction substantially parallel to the direction in which the restrainer rod penetrates the opening; and
   c. a runner connected to the footplate, which runner extends in a direction substantially parallel to the direction in which the restrainer rod penetrates the opening.

19. A casing spacer assembly according to claim 13 in which each bracket that is adapted to be connected to a clamping pad comprises:
   a. a radial web which contains at least one opening for receiving a clamping bolt and which, when connected to the restrainer ring half, extends in a direction substantially radially to the carrier pipe;

b. a footplate connected to the web, which footplate extends in a direction substantially perpendicular to the direction in which the clamping bolts penetrate the openings; and c. a runner connected to the footplate, which runner extends in a direction substantially perpendicular to the direction in which the clamping bolts penetrate the openings.

20. A clamping ring assembly according to claim 13 in which the clamping ring halves are cast ductile iron.

21. A clamping ring assembly according to claim 13 in which the clamping ring halves are formed of structural steel.

22. A clamping ring assembly according to claim 13 in which the spacer brackets are formed of ductile iron.

* * * * *